United States Patent
Brooker

(10) Patent No.: US 6,874,550 B2
(45) Date of Patent: Apr. 5, 2005

(54) GRAVITY FILL LINE VENT FITTING AND FILL SYSTEM

(75) Inventor: Steven C. Brooker, Hartville, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/422,089

(22) Filed: Apr. 24, 2003

(65) Prior Publication Data

US 2004/0211482 A1 Oct. 28, 2004

(51) Int. Cl.[7] .............................................. B65B 39/00
(52) U.S. Cl. ...................................... 141/299; 141/340
(58) Field of Search .............................. 141/2, 4, 5, 18, 141/59, 198, 199, 299, 340, 363–366, 383–385; 137/587, 588; 220/86.2

(56) References Cited

U.S. PATENT DOCUMENTS 5,074,343 A * 12/1991 Tyree, Jr. ..................... 141/300
5,445,196 A * 8/1995 Tyree, Jr. ..................... 141/297
5,479,970 A * 1/1996 Trani ........................... 141/297

* cited by examiner

Primary Examiner—Timothy L. Maust
(74) Attorney, Agent, or Firm—Renner, Otto, Boisselle & Sklar, LLP

(57) ABSTRACT

Gravity fill line vent fitting includes a body member having a water fill opening and vent opening adapted to be connected to the elevated ends of a water fill line and surrounding air vent line, respectively, of a potable water storage tank. An inner tubular extension and surrounding hose fitting may be connected to the inner/bottom side of the body member for use in attaching the water fill line and air vent line, respectively, to the body member. An outer tubular extension and surrounding service fitting may be connected to the outer side of the body member. A cap is insertable over the service fitting for sealing off both the water fill opening and vent opening.

20 Claims, 4 Drawing Sheets

GRAVITY FILL LINE VENT FITTING AND FILL SYSTEM

FIELD OF THE INVENTION

This invention relates generally to a gravity fill line vent fitting and fill system including such fitting that provides both a water fill path to an aircraft potable water storage tank or the like and a vent path for venting the tank during filling.

BACKGROUND OF THE INVENTION

Gravity fill systems for filling potable water storage tanks used in aircraft and the like are generally known. However, a need exists for better venting of air from inside the tank to ambient during filling. Insufficient venting unnecessarily prolongs the time needed to fill the tank with water.

An option is to add valves, lines and controls to better vent the tank during filling. However, this greatly adds to the cost and complexity of the system and requires the operator to open and close valves during servicing of the tank.

SUMMARY OF THE INVENTION

The present invention relates to a gravity fill line vent fitting and fill system including such fitting that provides both a water flow path for filling a potable water storage tank with water and a vent path for air to flow out of the tank during filling without the need for additional valving.

In accordance with one aspect of the invention, the fill line vent fitting includes both a water fill opening to which the tank water fill line is adapted to be connected and a vent opening to which the tank air vent line is adapted to be connected for venting the tank during filling with water.

In accordance with another aspect of the invention, the vent opening comprises a plurality of circumferentially spaced holes or slots in the fill line vent fitting radially outwardly of the water fill opening.

In accordance with another aspect of the invention, the fill line vent fitting includes an inner tubular extension in fluid communication with the water fill opening for connection of the water fill line and a hose fitting in fluid communication with the vent opening for connection of the air vent line.

In accordance with another aspect of the invention, the fill line vent fitting includes an outer tubular extension in fluid communication with the water fill opening adapted to receive a funnel for pouring water into the tank through the fitting, and a service fitting surrounds the outer tubular extension in fluid communication with the vent opening.

In accordance with another aspect of the invention, a cap is insertable over the service fitting for sealing off both the water fill opening and vent opening between servicings.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION

Figure 1:
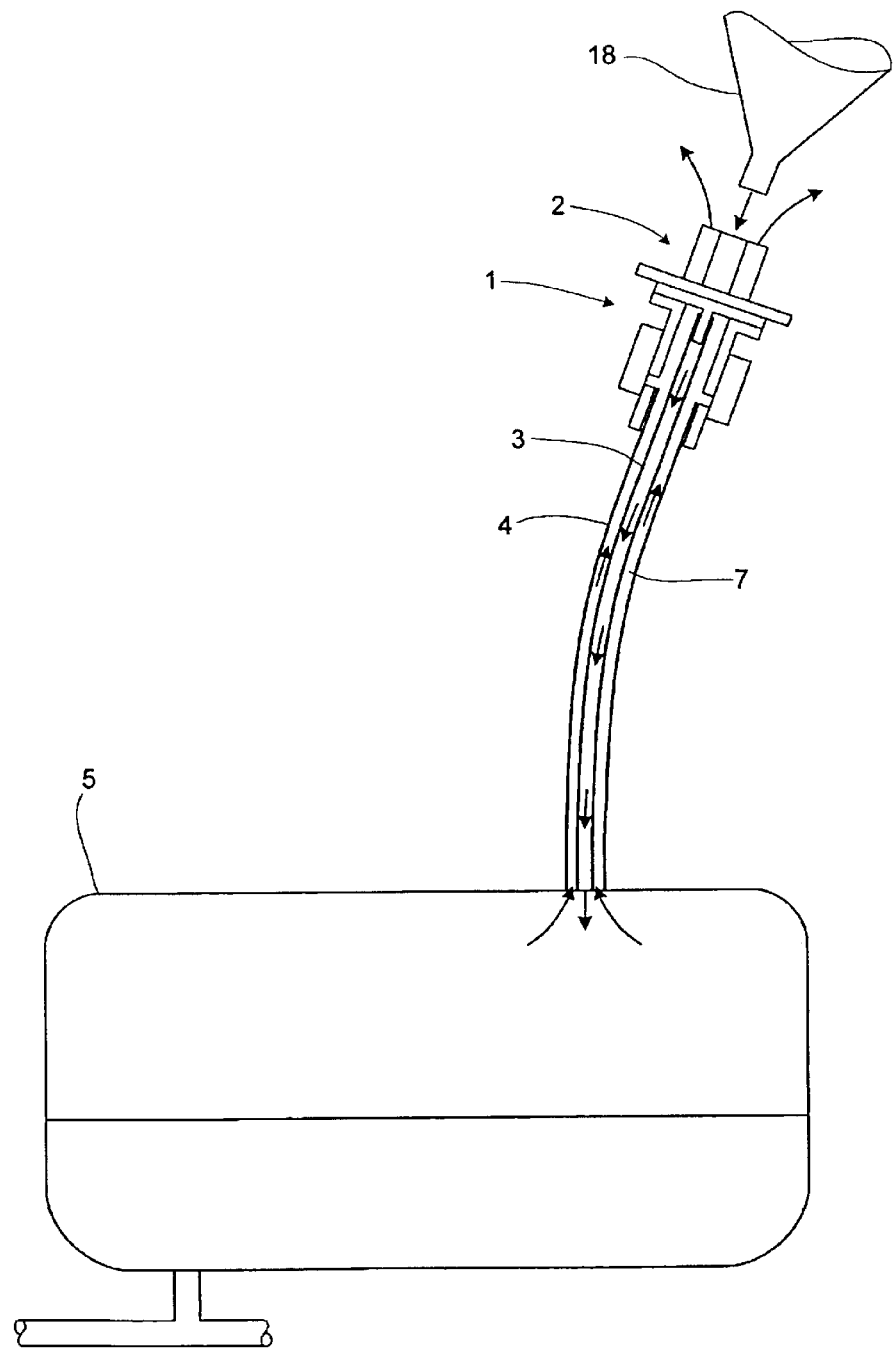
FIG. 1 is a schematic illustration of a gravity fill system including the gravity fill line vent fitting of the present invention connected to a potable water storage tank.

Referring now in detail to the drawings, and initially to FIG. 1, there is schematically shown a gravity fill system 1 including a gravity fill line vent fitting 2 according to the present invention. The gravity fill line vent fitting 2 is suitably connected to elevated outer ends of a water line 3 and air vent line 4 that are in fluid communication with an upper portion of a potable water storage tank 5 for providing both a water flow path for filling the tank with water and a vent path for air to flow out of the tank during filling without the need for additional valving as described hereafter. The water line 3 may comprise an inner tube or hose made for example of Teflon, and the air vent line 4 may comprise an outer tube or hose surrounding the inner hose in spaced relation therefrom to provide a vent path 7 between the inner and outer hoses.

Figure 2:
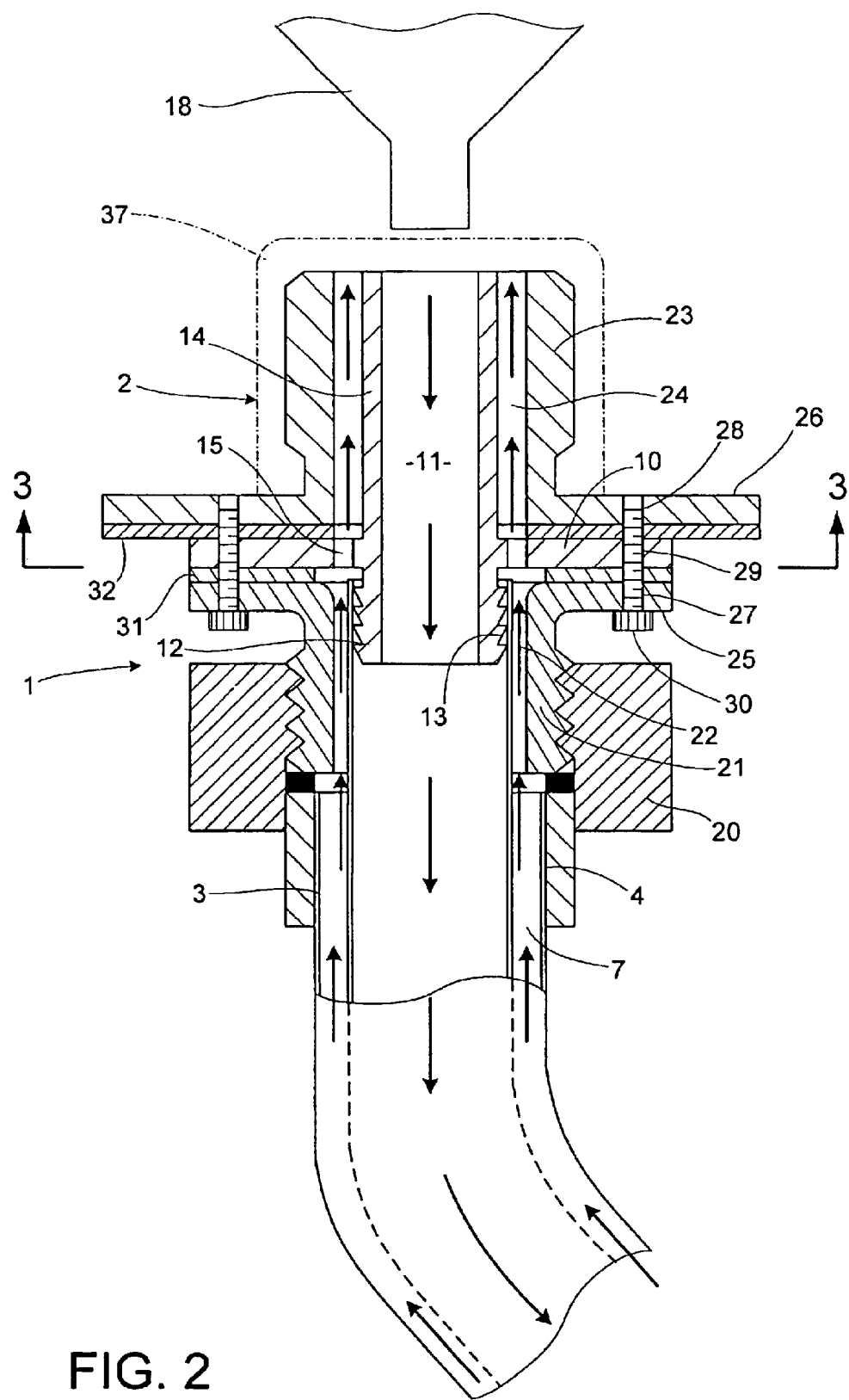
FIG. 2 is an enlarged longitudinal section through one form of gravity fill line vent fitting of the present invention.

As shown in greater detail in FIG. 2, the gravity fill line vent fitting 2 includes a body member 10 having a water fill opening 11 extending therethrough. On the inner or bottom side of the body member 10, in fluid communication with water fill opening 11, is an inner tubular extension 12 which may have outer ribs or barbs 13 for establishing a water tight seal with the outer end of the water line 3 when inserted over such tubular extension. On the upper or top side of the body member 10 in fluid communication with water fill opening 11 is an outer tubular extension 14 which may receive a nozzle or funnel 18 for ease of pouring water into the tank through the water fill opening.

Figure 3:
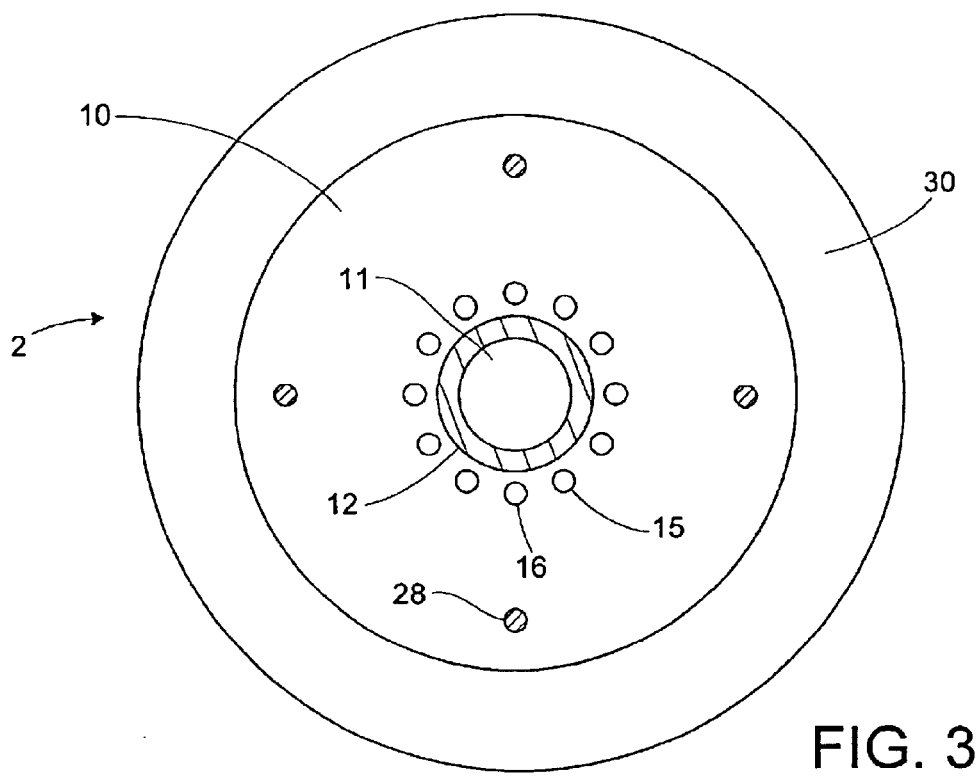
FIG. 3 is a transverse section through the fitting of FIG. 2 taken generally on the plane of the line 3—3 thereof showing a plurality of vent holes through the fitting.
Figure 4:
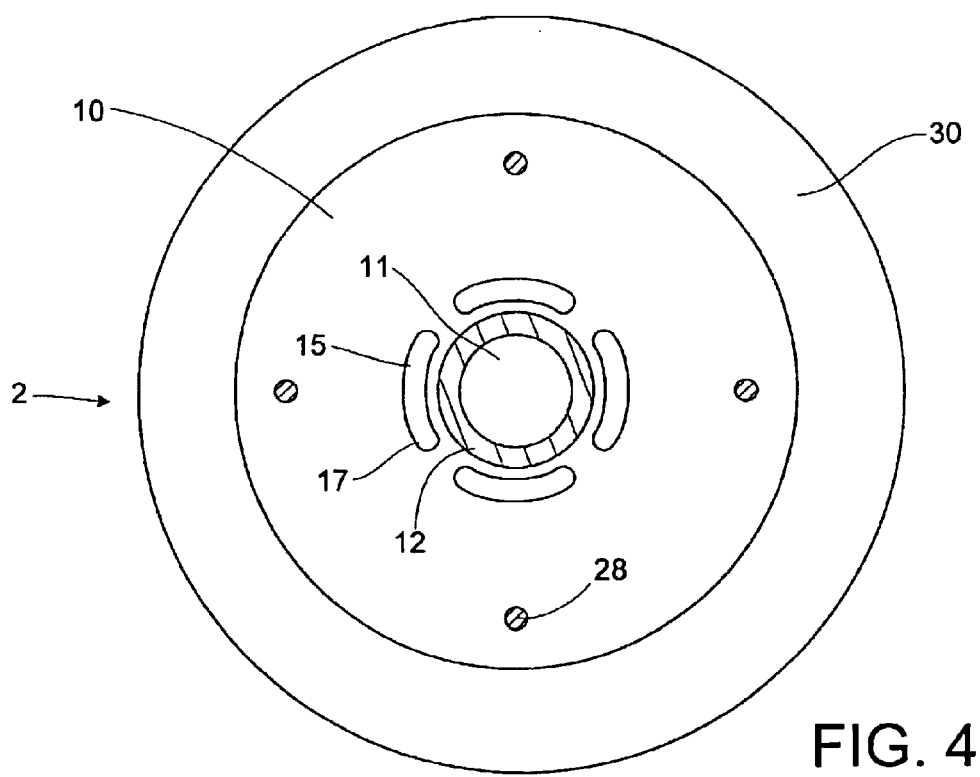
FIG. 4 is a transverse section similar to FIG. 3 but showing a plurality of vent slots through the fitting.

Radially outwardly of the water fill opening 11 and tubular extensions 12, 14 is a vent opening 15 which may comprise any number and size of air holes 16 or slots 17 in body member 10 as schematically shown in FIGS. 3 and 4 depending on the amount of flow area needed to vent the tank during servicing.

The air vent line 4 may be connected to the body member 10 as by providing a hose coupling 20 on the outer end of the air vent line for threaded engagement with a hose fitting 21 on the inner side of the body member. The hose fitting 21 surrounds the inner tubular extension 12 radially outwardly of the holes 16 or slots 17 for establishing a vent path 22 therebetween in fluid communication with the vent opening 15.

A service fitting 23 may surround the outer tubular extension 13 radially outwardly of the vent holes 16 or slots 17 in the body member 10 for establishing a vent path 24 therebetween in fluid communication with the vent opening 15. Both the hose fitting 21 and service fitting 23 may include adapter plates 25 and 26 having mounting holes 27 and 28 adapted to be aligned with mounting holes 29 in body member 10 for receipt of suitable fasteners 30 for mechanically fastening the hose fitting and service fitting to the body member. Suitable seals 31 and 32 may be interposed between the adapter plates and body member to provide fluid tight connections therebetween.

Figure 5:
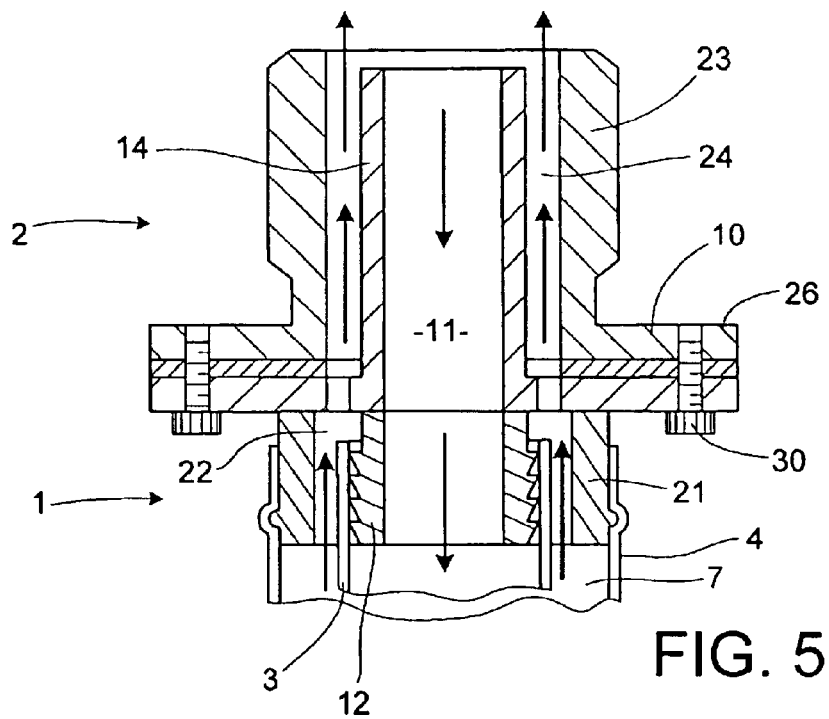
FIGS. 5 and 6 are longitudinal sections through alternative gravity fill line vent fittings of the present invention.
Figure 6:
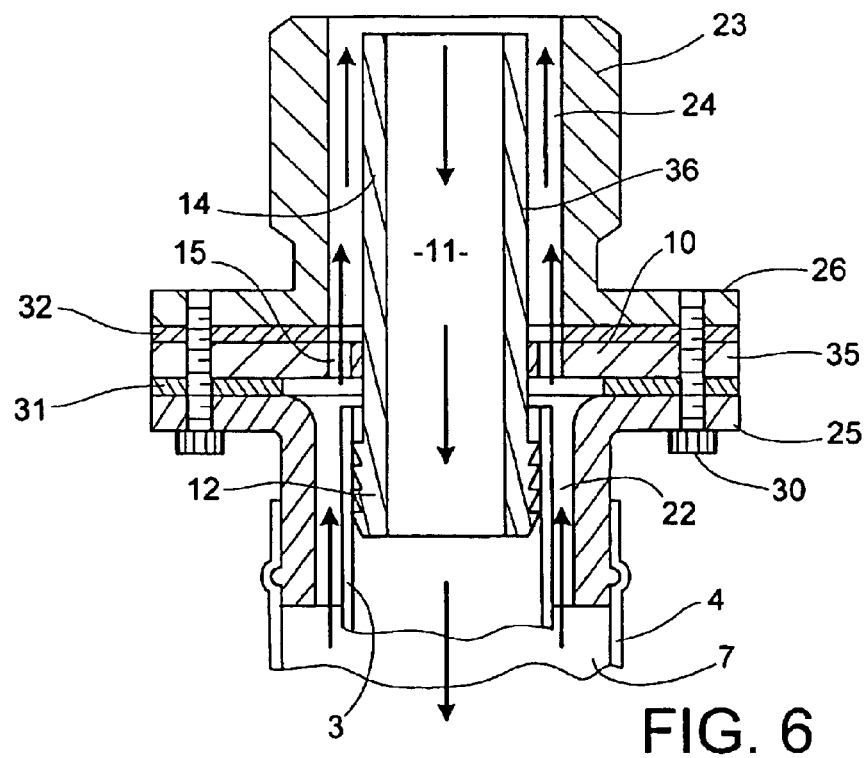

Both tubular extensions 12 and 14 and the body member 10 may be one piece as schematically shown in FIG. 2. Alternatively only one of the tubular extensions 14 and the body member 10 may be one piece as schematically shown in FIG. 5. The other tubular extension 12 and if desired the hose fitting 21 may be fixedly attached to the bottom side of the body member 10. In another embodiment shown in FIG. 6, the body member 10 may comprise a ring 35 press fitted on or otherwise secured to a tubular member 36 having opposite ends extending beyond opposite sides of the ring to provide the inner and outer tubular extensions 12 and 14, respectively. Further, the outer end of air vent line 4 may be pressed onto the inner tubular extension 12 as shown in FIGS. 5 and 6 instead of being threadedly connected thereto as shown in FIG. 2.

During servicing, the funnel 15, schematically shown in FIGS. 1 and 2, 3D may be inserted into the outer end of the outer tubular extension 14 to facilitate pouring of water into the water fill opening 11 of the fitting 2 for flow through the water fill line 3 into the tank 5 with the bleed air turned on. As water fills the tank, the excess air in the tank flows out through the air vent line 4 and vent opening 15 in the fitting 2 for venting to ambient. After servicing, a quick connect cap 37, schematically shown in phantom lines in FIG. 2, may be inserted over service fitting 23 for sealing off both the water fill opening 11 and vent opening 15 in the gravity fill line vent fitting 2.

Although the invention has been shown and described with respect to certain embodiments, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein exemplary embodiments of the invention. In addition, while a particular feature of the invention may have been disclosed with respect to only one embodiment, such feature may be combined with one or more other features of other embodiments as may be desired and advantageous for any given or particular application.

What is claimed is:

1. A gravity fill line vent fitting comprising a body member having a water fill opening adapted to be connected to an elevated end of a water fill line of a potable water storage tank for filling the tank with water, and a vent opening in said body member adapted to be connected to an air vent line of the tank surrounding the water fill line for providing a vent path for air to flow from the tank during filling of the tank with water, said vent opening having an upper end communicating with an outer surface of said body member at a location externally of said water fill opening.

2. The fitting of claim 1, wherein said vent opening comprises a plurality of circumferentially spaced holes or slots in said body member surrounding said water fill opening.

3. The fitting of claim 1, further comprising an inner tubular extension of said water fill opening on an inner side of said body member adapted to be connected to the water fill line.

4. The fitting of claim 3, further comprising an outer tubular extension of said water fill opening on an outer side of said body member adapted to receive a nozzle or funnel for delivering water into the water fill line through said water fill opening.

5. The fitting of claim 4, wherein said tubular extensions are integral with said body member.

6. The fitting of claim 4, wherein said tubular extensions are formed by a single tube extending outwardly beyond opposite sides of said body member.

7. The fitting of claim 4, further comprising a service fitting on the outer side of said body member surrounding said outer tubular extension radially outwardly of said vent opening in said body member.

8. The fitting of claim 7, further comprising a cap insertable over said service fitting for sealing off said water fill opening and said vent opening.

9. The fitting of claim 3, further comprising a hose fitting connected to the inner side of said body member surrounding said inner tubular extension radially outwardly of said vent opening adapted to be connected to the air vent line.

10. The fitting of claim 9, wherein said hose fitting is integral with said body member.

11. The fitting of claim 9, further comprising a service fitting connected to the outer side of said body member surrounding said outer tubular extension radially outwardly of said vent opening.

12. A gravity fill line vent fitting comprising a body member having a water fill opening adapted to be connected to an elevated end of a water fill line of a potable water storage tank for filling the tank with water, a vent opening in said body member adapted to be connected to an air vent line of the tank surrounding the water fill line for providing a vent path for air to flow from the tank during filling of the tank with water, an inner tubular extension of said water fill opening on an inner side of said body member adapted to be connected to the water fill line, a hose fitting connected to the inner side of said body member surrounding said inner tubular extension radially outwardly of said vent opening adapted to be connected to the air vent line, and a service fitting connected to the outer side of said body member surrounding said outer tubular extension radially outwardly of said vent opening, and wherein said hose fitting and said service fitting include adapter plates that are mechanically fastened to the inner and outer sides, respectively, of said body member in sealed relation thereto.

13. The fitting of claim 12, wherein aligned mounting holes are provided in said body member and said adapter plates radially outwardly of said vent opening for receipt of fasteners for securing said hose fitting and said service fitting to said body member.

14. The fitting of claim 1, wherein the inner side of said body member includes an inner tubular extension in fluid communication with said water fill opening, said inner tubular extension being configured for attachment of the water fill line to said inner tubular extension.

15. The fitting of claim 14, wherein the inner side of said body member includes a hose fitting surrounding said inner tubular extension in fluid communication with said vent opening, said hose fitting being configured for attachment of the air vent line to said hose fitting.

16. In an aircraft, a potable water storage tank, a water fill line connected to said storage tank, and a gravity fill line vent fitting, said gravity fill line fitting comprising a body member having a water fill opening connected to an elevated end of a said water fill line of a said potable water storage tank for filling the tank with water, a vent opening in said body member connected to an air vent line of the tank for providing a vent path for air to flow from the tank during filling of the tank with water, an outer tubular extension of said water fill opening on an outer side of said body member adapted to receive a nozzle or funnel for delivering water into the water fill line through said water fill opening, a service fitting on the outer side of said body member surrounding said outer tubular extension and said vent opening, and a cap insertable over said service fitting for sealing off said water fill opening and said vent opening.

17. A potable water storage tank filling system comprising a gravity fill line vent fitting having a water fill opening to which an elevated outer end of a tank water fill line is connected for filling the tank with water through said water fill opening, and a vent opening to which an outer end of a tank air vent line surrounding said tank water fill line is connected for venting the tank during filling of the tank with water through said water fill opening, said water fill opening having an inner tubular extension to which the water fill line is connected, and there being provided an inner tubular element forming an extension of said vent opening, said inner tubular element being concentric with said inner tubular extension and connected to the air vent line.

18. The system of claim 17, wherein said inner tubular element is formed by a hose fitting line vent fitting surrounding said inner tubular extension and said vent opening, said outer end of said tank air vent line being connected to said hose fitting.

19. The system of claim 18, further comprising an outer tubular extension of said water fill opening on an outer side of said gravity fill line vent fitting, a service fitting on said outer side of said gravity fill line vent fitting surrounding said outer tubular extension and said vent opening, and a cap insertable over said service fitting for sealing off said water fill opening and said vent opening.

20. A potable water storage tank filling system comprising a gravity fill line vent fitting having a water fill opening to which an elevated outer end of a tank water fill line is connected for filling the tank with water through said water fill opening, and a vent opening to which an outer end of a tank air vent line surrounding said tank water fill line is connected for venting the tank during filling of the tank with water through said water fill opening, and wherein said vent opening comprises a plurality of circumferentially spaced holes or slots in said fitting radially outwardly of said water fill opening.

* * * * *

UNITED STATES PATENT AND TRADEMARK OFFICE
CERTIFICATE OF CORRECTION

| | | |
|---|---|---|
| PATENT NO. | : 6,874,550 B2 | Page 1 of 1 |
| APPLICATION NO. | : 10/422089 | |
| DATED | : April 5, 2005 | |
| INVENTOR(S) | : Steven C. Brooker | |

It is certified that error appears in the above-identified patent and that said Letters Patent is hereby corrected as shown below:

Claim 18 was misprinted and should read as follows:

Column 6, line 11, "hose fitting line vent fitting" should read --hose fitting--.

Signed and Sealed this

Thirty-first Day of October, 2006

JON W. DUDAS
*Director of the United States Patent and Trademark Office*